United States Patent
Fitzpatrick, Sr. et al.

(10) Patent No.: US 9,846,723 B1
(45) Date of Patent: Dec. 19, 2017

(54) SYSTEM, METHOD, AND COMPUTER PROGRAM FOR AUTOMATICALLY ACCESSING DATA IN A DATABASE BASED ON QUERY INFORMATION

(71) Applicant: Amdocs Software Systems Limited, Dublin 3 (IE)

(72) Inventors: Daniel William Fitzpatrick, Sr., Wentzville, MO (US); Robert J. Jones, Palm Bay, FL (US); Tatiana Zagorovski, Chesterfield, MO (US)

(73) Assignees: Amdocs Software Systems Limited, Dublin 3 (IE); Amdocs Development Limited, Limassol (CY)

( * ) Notice: Subject to any disclaimer, the term of this patent is extended or adjusted under 35 U.S.C. 154(b) by 312 days.

(21) Appl. No.: 14/525,080

(22) Filed: Oct. 27, 2014

(51) Int. Cl.
*G06F 17/30* (2006.01)

(52) U.S. Cl.
CPC .... *G06F 17/30433* (2013.01); *G06F 17/3056* (2013.01); *G06F 17/30389* (2013.01)

(58) Field of Classification Search
CPC ............... G06F 17/30433; G06F 17/3056
See application file for complete search history.

(56) References Cited

U.S. PATENT DOCUMENTS

| | | | |
|---|---|---|---|
| 6,366,915 B1 * | 4/2002 | Rubert | G06F 17/30545 707/770 |
| 6,842,758 B1 * | 1/2005 | Bogrett | G06F 17/30448 |
| 2007/0174350 A1 * | 7/2007 | Pell | G06F 3/038 |
| 2010/0205217 A1 * | 8/2010 | Kocsis | G06F 17/30893 707/784 |
| 2014/0330866 A1 * | 11/2014 | Hess | G06F 17/30864 707/771 |

* cited by examiner

*Primary Examiner* — Rehana Perveen
*Assistant Examiner* — Alexander Khong
(74) *Attorney, Agent, or Firm* — Zilka-Kotab, PC

(57) ABSTRACT

A system, method, and computer program product are provided for automatically accessing data in a database based on query information. In use, query information is received from a user interface, the query information including at least one selection of a preconfigured set of queries that are grouped logically based on a team or an application and the query information further including input parameters defined by a user utilizing the user interface. Additionally, data to access in at least one database is identified based on the query information. Further, a connection with the at least one database is automatically established, the connection with the at least one database being established utilizing a predefined database connection for one or more environments with which the user interface is associated. Moreover, the data in the at least one database is automatically accessed based on the query information.

8 Claims, 4 Drawing Sheets

DB Validations and Transaction XMLs

OMS ◄ Logical Group ▼ | OMS Transaction ▼ | 1410 SAT1A1 File OMS | Environment/DB Name ▼ | Run Query | View Last Query Uverse BAN or Step Instance ID | Query Name Activity | Order Action ID | Time Stamp

*Query Input Parameters*

| Interface Name | XML Type | Time Stamp | Order Action ID | XML Size | User ID | Logical Server Name | Step Instance ID | Sequence No. |

DATA

Open Files
Save and Open Selected Files
Save Selected Files
Save All Files
Open Log File(s) Directory
Export to Excel

*Options For Storing Results*

FIGURE 2

SYSTEM, METHOD, AND COMPUTER PROGRAM FOR AUTOMATICALLY ACCESSING DATA IN A DATABASE BASED ON QUERY INFORMATION

FIELD OF THE INVENTION

The present invention relates to database access and more particularly to automatically accessing data in a database based on query information.

BACKGROUND

Databases are used by many applications and teams to store data, settings, and documents related to their team or application. In order for users to perform these validations, the users must know several key details about each database. This include details such as the connection details (e.g. server, username, password, etc.), the particular table the data is stored, and the columns available to search.

In complex large-scale software projects it is necessary to perform different validations on multiple databases to ensure all systems/applications involved in the flow work as expected. This becomes very challenging since it is rare that a user will have deep knowledge about multiple different systems. In addition, when users need pull a file from the database as opposed to executing a query, it can be much more complicated to open the file or even save the file to a local drive.

There is thus a need for addressing these and/or other issues associated with the prior art.

SUMMARY

A system, method, and computer program product are provided for automatically accessing data in a database based on query information. In use, query information is received from a user interface, the query information including at least one selection of a preconfigured set of queries that are grouped logically based on a team or an application and the query information further including input parameters defined by a user utilizing the user interface. Additionally, data to access in at least one database is identified based on the query information. Further, a connection with the at least one database is automatically established, the connection with the at least one database being established utilizing a predefined database connection for one or more environments with which the user interface is associated. Moreover, the data in the at least one database is automatically accessed based on the query information.

BRIEF DESCRIPTION OF THE DRAWINGS

FIG. 2 illustrates a user interface for automatically accessing data in a database based on query information, in accordance with one embodiment.

DETAILED DESCRIPTION

Figure 1:
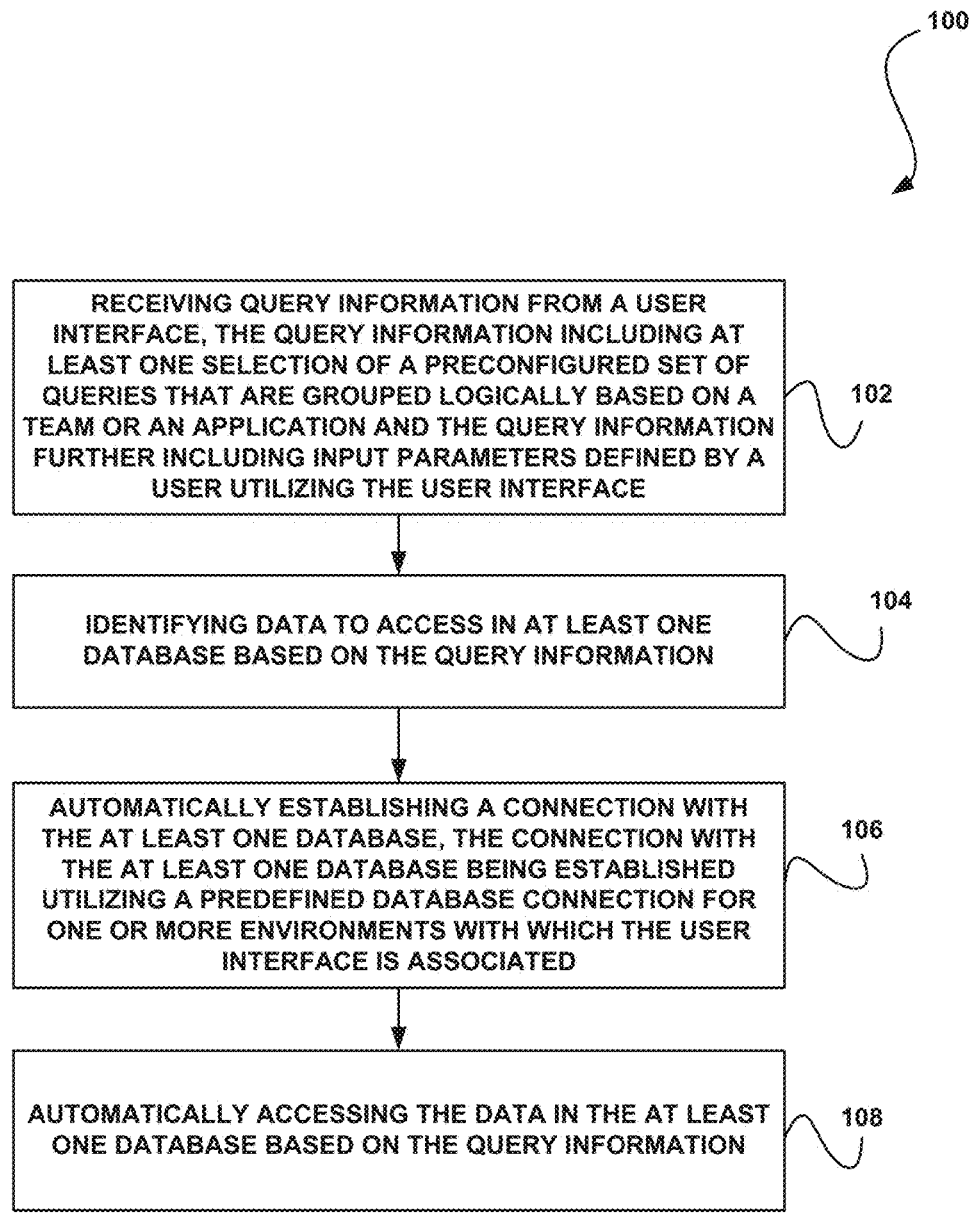
FIG. 1 illustrates a method for automatically accessing data in a database based on query information, in accordance with one embodiment.

FIG. 1 illustrates a method 100 for automatically accessing data in a database based on query information, in accordance with one embodiment.

As shown, query information is received from a user interface. See operation 102. The query information includes at least one selection of a preconfigured set of queries that are grouped logically based on a team or an application. The query information also includes input parameters defined by a user utilizing the user interface.

The team may include one or more individuals and/or organizations. Additionally, the application may include any type of application.

Further, the preconfigured set of queries may include queries that are unique to a user selected database. For example, the user may select a database using the user interface and common queries associated with the database may be displayed. In other words, the preconfigured set of queries may include queries that are commonly used by users associated with the user selected database.

In one embodiment, the preconfigured set of queries may include one or more configurable input parameters. In this case, in one embodiment, the configurable input parameters may be defined by the user utilizing the user interface.

Additionally, in one embodiment, one or more input options for the user may be presented utilizing the user interface, based on the query information. As an example, the input options may include one or more text fields. As another example, the input options may be displayed in a dropdown list. Further, in one embodiment, the input options may include a time frame from within to search.

Still yet, in one embodiment, queries and associated configurable input parameters of the preconfigured set of queries may be capable of being edited (e.g. utilizing the user interface, etc.). In another embodiment, the queries and associated configurable input parameters of the preconfigured set of queries may be capable of being removed from the preconfigured set of queries (e.g. utilizing the user interface, etc.). In another embodiment, queries and associated configurable input parameters may be capable of being added to the preconfigured set of queries (e.g. utilizing the user interface, etc.).

With further reference to FIG. 1, data to access in at least one database is identified based on the query information. See operation 104.

Further, a connection with the at least one database is automatically established. See operation 106. The connection with the at least one database is established utilizing a predefined database connection for one or more environments with which the user interface is associated. In one embodiment, if the database supports multiple environments, different connections for those environments may be presented to the user utilizing the user interface.

In addition, in one embodiment, the user interface may allow for the user to select the application and/or the team in which the user is interested. In this case, selecting the application or the team utilizing the user interface may limit (e.g. narrow down) choices of queries offered of the preconfigured set of queries. Further, in one embodiment, selecting the application or the team utilizing the user interface may limit choices of connections offered to connections that are related to the selected application or team.

Moreover, the data in the at least one database is automatically accessed based on the query information. See operation 108. In this case, accessing the data may include displaying the data utilizing the user interface and/or allowing the data to be stored locally, etc.

Further, in one embodiment, the method 100 may include analyzing at least a portion of the query information to ensure the at least a portion of the query information meets predefined criteria and executing a query to automatically access the data in the at least one database based on the query information, when the query information meets predefined criteria.

In one embodiment, the method 100 may be implemented in the context of a software tool (i.e. computer code, etc.) that allows users, such as software testers, to view database tables for validations or any information stored in the database, or find and download files stored in a database. All of this may be accomplished without the user having any knowledge of SQL and backend table structures, or having to enter any scripts or connection details.

Using only a few predefined, easily edited dropdown lists the user may select what type of script to execute and on which server they want to run it. Upon entering a value for one of the columns, for example, the query may be executed such that the user can view tables or download one or more database files that are stored in the table(s) queried. This may be accomplished with a self-opening, self-closing connection to the database that is not maintained by the user and reduces overhead on the database itself.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 2 illustrates a user interface 200 for automatically accessing data in a database based on query information, in accordance with one embodiment. As an option, the user interface 200 may be implemented in the context of the details of FIG. 1. Of course, however, the user interface 200 may be implemented in the context of any desired environment. Further, the aforementioned definitions may equally apply to the description below.

As shown, the user interface 200 includes a user selectable dropdown list for a logical group, a query name, an environment/database name, query input parameters, and various other items. The user interface 200 also has options for storing accessed results.

Databases are used by many applications and teams to store data, settings and/or documents related to their team or application. In order for users to perform these validations, they must know several key details about each database: the connection details (e.g. server, username, password, etc.), the table in which the data they are looking for is stored, and what columns are there to search.

In complex large-scale software projects, it is necessary to perform different validations on multiple databases to ensure all systems/applications involved in the flow work as expected. This becomes very challenging since rarely one user can have deep knowledge about multiple different systems. In addition, when users need to execute a query and also pull a file from the database, it can be much more complicated to open the file or even save the file to their local drive.

Thus, the user interface 200 may be part of a tool where all the background work of connecting, querying, viewing, and saving the data contained in any database is done automatically, without the need for the user to have deep knowledge of the validated applications, SQL, database software, such as Oracle, or database viewing tools, such as TOAD or SQL Developer. This allows, for example, a new member of a team with little or no experience to be able to acquire data as quickly as someone who has far more experience with that team.

In use, first, a user may configure a set of queries grouped logically by either team and/or by application and define database connections for environments where the tool is going to be used. Further, queries may be unique to the selected database and may be commonly used queries by users of that database.

The query may contain one or more configurable input parameters. Also, in one embodiment, the queries and their input parameters may be added, edited or removed as needed. This configuration task may be performed by tool administrators/support group, for example.

For the end user, such as a software tester, selecting the application or team utilizing the interface 200 will narrow down the queries and connections that are related to that application or team. With the application and query type selected, the user may use the interface 200 to select the connection the user wants to use for the database. For example, a database that supports multiple environments may have different connections for those environments.

Based on the chosen query, the interface 200 will show one or more input options from which the user may select. This may be one or more text fields, a dropdown list, or an option to select the date and/or time from within to search. Once all options and input values are selected, the user may execute the search.

The tool associated with the interface 200 may then analyze the input to ensure the input meets the criteria of the selected query. As an example, if the user inputs an alphanumeric value when only a numeric value is expected, the tool will not execute the query and may notify the user of the discrepancy.

If the required database connection is not listed, the interface 200 may offer the user the option to enter the connection details manually, depending on needs. More advanced users can also enter any SQL script they may have and view the results. This would still use the pre-selected database connection and display the results on the GUI 200 once executed.

If all the input is validated successfully, the tool will execute the query and present the results to the user in the interface 200. At this time the user can view the actual SQL query that was executed if the user needs to validate what was performed.

In one embodiment, the user may view the results and even export results to a spreadsheet or file (such as Excel) with one click. If there are files to download, the user may select one or more of those files and in one click the user can have those files downloaded and saved to a local system. If the table has one or more columns with distinct values, the algorithm may provide an option to narrow down the results by dynamically displaying the distinct values in that column, depending on the selected script.

Thus, the user interface 200 and associated computer code provide a complete, fast and reliable solution for a user who needs to perform a database validations for multiple applications manually, either during issues troubleshooting or during manual testing of complex large scale end to end projects where normal test automation is not possible.

Figure 3:
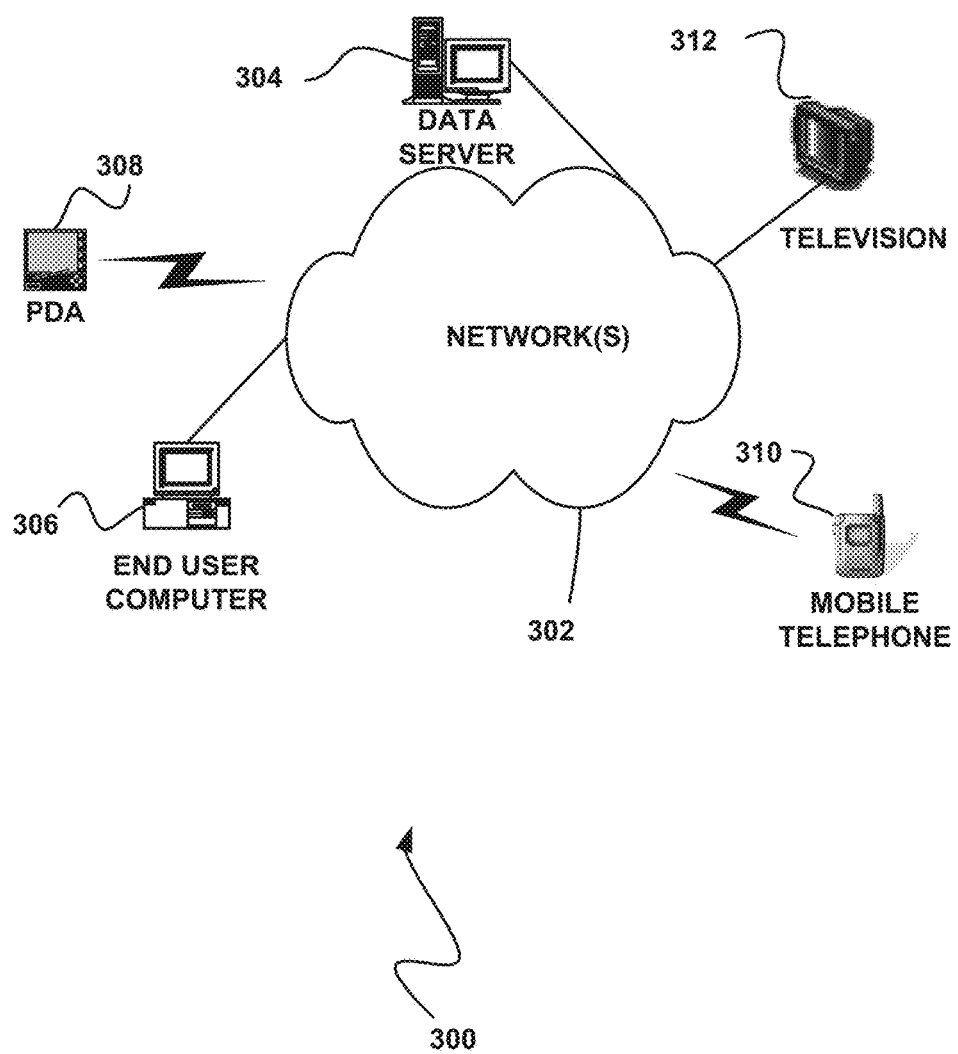
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
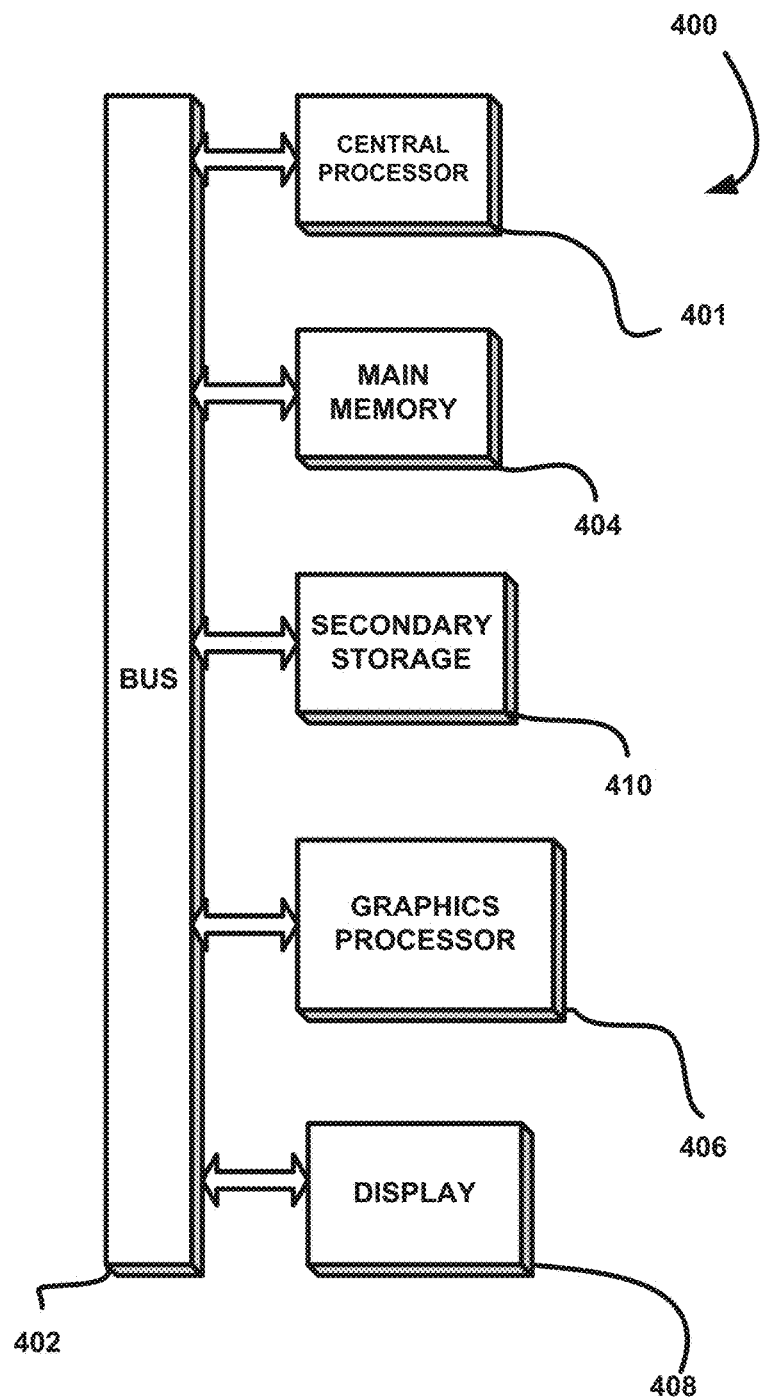
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for storing, for each of a plurality of databases:
   a plurality of queries that are unique to the database and that are grouped logically according to teams or applications, and
   a plurality of database connections for different user environments that are associated with the database and that are grouped logically according to the teams or the applications, wherein the plurality of database connections that are associated with the database each include details for connecting to the database, the details including an indication of a server, a username and a password, wherein the database stores data related to the teams or applications;
   computer code for providing, to a user, a first list of the databases;
   computer code for receiving, from the user through the first list, a first selection of one of the databases;
   computer code for providing, to the user, a second list of the teams or applications;
   computer code for receiving, from the user through the second list, a second selection of one of the teams or applications;
   computer code, responsive to the first selection and the second selection, for displaying a subset of the plurality of queries that are unique to the selected one of the databases and that are grouped logically according to the selected one of the teams or applications;
   computer code for receiving, from the user, a third selection of one of the queries in the subset of the plurality of queries;
   computer code for displaying a subset of the plurality of database connections that are associated with the selected one of the databases and that are grouped logically according to the selected one of the teams or applications;
   computer code for receiving, from the user, a fourth selection of one of the database connections in the subset of the plurality of database connections;
   computer code for presenting one or more input options for the user, based on the one of the queries selected by the user, wherein the one or more input options include a time frame from within to search;
   computer code for receiving, from the user through the one or more input options, input parameters;
   computer code for automatically establishing a connection with the selected one of the databases, using the selected one of the database connections;
   computer code for automatically executing, on the selected one of the databases through the connection, the selected one of the queries according to the input parameters, including filtering the data in the database by the selected one of the teams or applications; and
   computer code for displaying results of the executed query.

2. The computer program product of claim 1, wherein the computer program product is operable such that the plurality of queries that are unique to the database include queries that are commonly used by users associated with the database.

3. The computer program product of claim 1, wherein the computer program product is operable such that the one of the queries selected by the user includes one or more configurable input parameters.

4. The computer program product of claim 3, wherein the computer program product is operable such that the input parameters received from the user configure the one or more configurable input parameters.

5. The computer program product of claim 1, wherein the computer program product is operable such that the one or more input options include one or more text fields.

6. The computer program product of claim 1, wherein the computer program product is operable such that the one or more input options are displayed in a dropdown list.

7. A method, comprising:
   storing, for each of a plurality of databases:
   a plurality of queries that are unique to the database and that are grouped logically according to teams or applications, and
   a plurality of database connections for different user environments that are associated with the database and that are grouped logically according to the teams or the applications, wherein the plurality of database connections that are associated with the database each include details for connecting to the database, the details including an indication of a server, a username and a password, wherein the database stores data related to the teams or applications;

providing, to a user, a first list of the databases;
receiving, from the user through the first list, a first selection of one of the databases;
providing, to the user, a second list of the teams or applications;
receiving, from the user through the second list, a second selection of one of the teams or applications;
responsive to the first selection and the second selection, displaying a subset of the plurality of queries that are unique to the selected one of the databases and that are grouped logically according to the selected one of the teams or applications;
receiving, from the user, a third selection of one of the queries in the subset of the plurality of queries;
displaying a subset of the plurality of database connections that are associated with the selected one of the databases and that are grouped logically according to the selected one of the teams or applications;
receiving, from the user, a fourth selection of one of the database connections in the subset of the plurality of database connections;
presenting one or more input options for the user, based on the one of the queries selected by the user, wherein the one or more input options include a time frame from within to search;
receiving, from the user through the one or more input options, input parameters; automatically establishing a connection with the selected one of the databases, using the selected one of the database connections;
automatically executing, on the selected one of the databases through the connection, the selected one of the queries according to the input parameters, including filtering the data in the database by the selected one of the teams or applications; and displaying results of the executed query.

8. A system comprising:
a memory system; and
one or more processing cores coupled to the memory system and that are each configured to:
store, for each of a plurality of databases:
  a plurality of queries that are unique to the database and that are grouped logically according to teams or applications, and
  a plurality of database connections for different user environments that are associated with the database and that are grouped logically according to the teams or the applications, wherein the plurality of database connections that are associated with the database each include details for connecting to the database, the details including an indication of a server, a username and a password, wherein the database stores data related to the teams or applications;
provide, to a user, a first list of the databases;
receive, from the user through the first list, a first selection of one of the databases;
provide, to the user, a second list of the teams or applications;
receive, from the user through the second list, a second selection of one of the teams or applications;
display, responsive to the first selection and the second selection, a subset of the plurality of queries that are unique to the selected one of the databases and that are grouped logically according to the selected one of the teams or applications;
receive, from the user, a third selection of one of the queries in the subset of the plurality of queries;
display a subset of the plurality of database connections that are associated with the selected one of the databases and that are grouped logically according to the selected one of the teams or applications;
receive, from the user, a fourth selection of one of the database connections in the subset of the plurality of database connections;
present one or more input options for the user, based on the one of the queries selected by the user, wherein the one or more input options include a time frame from within to search;
receive, from the user through the one or more input options, input parameters;
automatically establish a connection with the selected one of the databases, using the selected one of the database connections;
automatically execute, on the selected one of the databases through the connection, the selected one of the queries according to the input parameters, including filtering the data in the database by the selected one of the teams or applications; and
display results of the executed query.

* * * * *